United States Patent
Ranga et al.

(10) Patent No.: US 9,090,172 B2
(45) Date of Patent: Jul. 28, 2015

(54) CHARGING STATIONS FOR USE IN CHARGING ELECTRICALLY POWERED VEHICLES AND RELATED METHODS

(75) Inventors: Swamy Muddaiah Ranga, Plainville, CT (US); Heather Ellen Pugliese, Amston, CT (US); Cecil Rivers, Jr., West Hartford, CT (US)

(73) Assignee: General Electric Company, Schenectady, NY (US)

( * ) Notice: Subject to any disclaimer, the term of this patent is extended or adjusted under 35 U.S.C. 154(b) by 820 days.

(21) Appl. No.: 13/355,947

(22) Filed: Jan. 23, 2012

(65) Prior Publication Data

US 2013/0187599 A1    Jul. 25, 2013

(51) Int. Cl.
*H02J 7/00*     (2006.01)
*B60K 6/442*    (2007.10)
*B60L 11/18*    (2006.01)

(52) U.S. Cl.
CPC .......... *B60L 11/1825* (2013.01); *Y02T 10/7005* (2013.01); *Y02T 90/121* (2013.01); *Y02T 90/128* (2013.01); *Y02T 90/14* (2013.01); *Y10T 29/49002* (2015.01)

(58) Field of Classification Search
CPC ....................................... Y02T 90/14
USPC ........................................... 320/109
See application file for complete search history.

(56) References Cited

U.S. PATENT DOCUMENTS

| | | | |
|---|---|---|---|
| D664,089 S * | 7/2012 | Chin-Ho Kim et al. | D13/107 |
| 8,558,504 B2 * | 10/2013 | Brown et al. | 320/109 |
| 2009/0085514 A1 * | 4/2009 | Mizoguchi et al. | 320/113 |
| 2010/0315040 A1 * | 12/2010 | Sakurai | 320/109 |
| 2013/0175083 A1 * | 7/2013 | Bonwit et al. | 174/520 |

OTHER PUBLICATIONS

Eaton Corporation, Eaton Pow-R-Station with integrated Liberty PlugIns secure access technology, www.eaton.com/plugin, accessed on Jan. 23, 2012, 2 pages.
Coulomb Technologies, ChargePoint Networked Charging Stations, www.coulombtech.com, accessed on Jan. 23, 2012, pp. 4.

* cited by examiner

*Primary Examiner* — Edward Tso
*Assistant Examiner* — Ahmed Omar
(74) *Attorney, Agent, or Firm* — General Electric Company

(57) ABSTRACT

Charging stations for use in charging an electrically powered vehicle and related methods are disclosed. One example charging station includes a housing having an interior. The housing is configured to enclose at least one vehicle charging component and defines a receptacle opening. The charging station further includes a first receptacle configured to receive a charging connector. The receptacle includes a front portion and a back portion. The back portion of the first receptacle includes a first drain port configured to permit a fluid flow to drain from the first receptacle. The first receptacle is configured to be positioned at least partially within the first receptacle opening, such that the back portion of the first receptacle is positioned within the first enclosure. The first enclosure defines a first drain opening configured to permit fluid from the first receptacle to an exterior of said first enclosure.

19 Claims, 4 Drawing Sheets

CHARGING STATIONS FOR USE IN CHARGING ELECTRICALLY POWERED VEHICLES AND RELATED METHODS

BACKGROUND OF THE INVENTION

The subject matter disclosed herein relates generally to charging stations and methods and, more particularly, to charging stations having enclosures to drain fluid entering the charging station through a receptacle.

Electrically powered vehicles, including electric vehicles and plug-in hybrid electric vehicles, include electric motors powered by energy storage devices, such as batteries. Because an energy storage device is depleted of energy as the vehicle is operated, the operator of the vehicle must recharge the energy storage device prior to using the vehicle again.

At least some known vehicle charging stations are provided for use in various environments. Such charging stations are designed to charge electrically powered vehicles, while providing security and protection for components utilized in charging the vehicle. Charging stations include a variety of constructions to withstand the environmental conditions, in which the charging stations may be installed. Specifically, for example, charging stations are often constructed to inhibit the ingress of moisture, such as rain and/or condensation, into the charging station. Various charging station components, such as charging connectors and receptacles for retaining the charging connectors, provide potential ingress points for moisture. Known charging stations generally rely on the orientation of the receptacles and/or drain ports defined by the charging connectors to carry moisture away from the charging station, thereby preventing ingress of moisture into the charging station.

BRIEF DESCRIPTION OF THE INVENTION

In one aspect, a charging station for charging an electrically powered vehicle is provided. The charging station includes a housing having an interior. The housing is configured to enclose at least one vehicle charging component and defines a receptacle opening. The charging station further includes a first receptacle configured to receive a charging connector. The receptacle includes a front portion and a back portion. The back portion of the first receptacle includes a first drain port configured to permit a fluid flow to drain from the first receptacle. The charging station also includes a first enclosure substantially surrounding the first receptacle opening and configured to seal the first receptacle opening. The first receptacle is configured to be positioned at least partially within the first receptacle opening, such that the back portion of the first receptacle is positioned within the first enclosure. The first enclosure defines a first drain opening configured to permit fluid from the first receptacle to an exterior of said first enclosure.

In another aspect, a charging station for charging an electrically powered vehicle is provided. The charging station includes a housing having an interior. The housing is configured to enclose at least one vehicle charging component, and the housing defines a receptacle opening. The charging station further includes an enclosure substantially surrounding the receptacle opening and configured to seal the receptacle opening. The receptacle opening configured to receive a receptacle at least partially therein, such that a back portion of the receptacle is positioned within the enclosure. The enclosure defines a first drain opening configured to permit a fluid flow within said enclosure to an exterior of said enclosure.

In yet another aspect, a method for fabricating a charging station for charging an electrically powered vehicle is provided. The method includes providing a housing having an interior and defining a receptacle opening, the receptacle opening configured to receive a receptacle, providing an enclosure configured to substantially surround the receptacle opening and to seal the receptacle opening, the enclosure defining a drain opening configured to permit fluid from a receptacle to exit the enclosure, positioning the receptacle at least partially within the receptacle opening such that the back portion of the receptacle is disposed within the enclosure, and coupling the receptacle to the housing.

DETAILED DESCRIPTION OF THE INVENTION

The embodiments described herein relate to charging stations for charging electrically powered vehicles through charging connectors. More specifically, the embodiments described herein relate to charging stations having enclosures to drain fluid entering the charging station through a receptacle.

Figure 1:
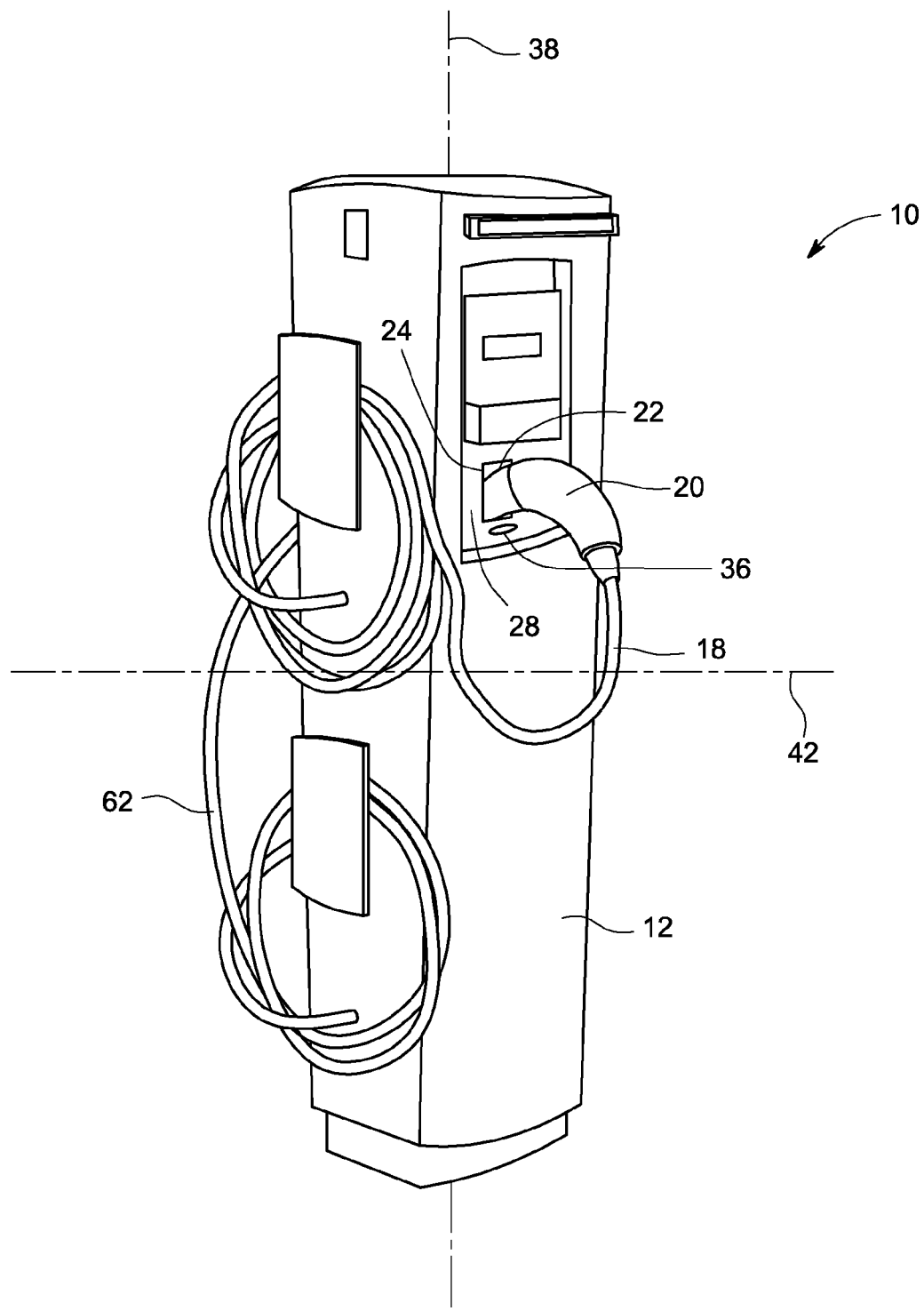
FIG. 1 is a perspective view of an exemplary charging station.
Figure 2:
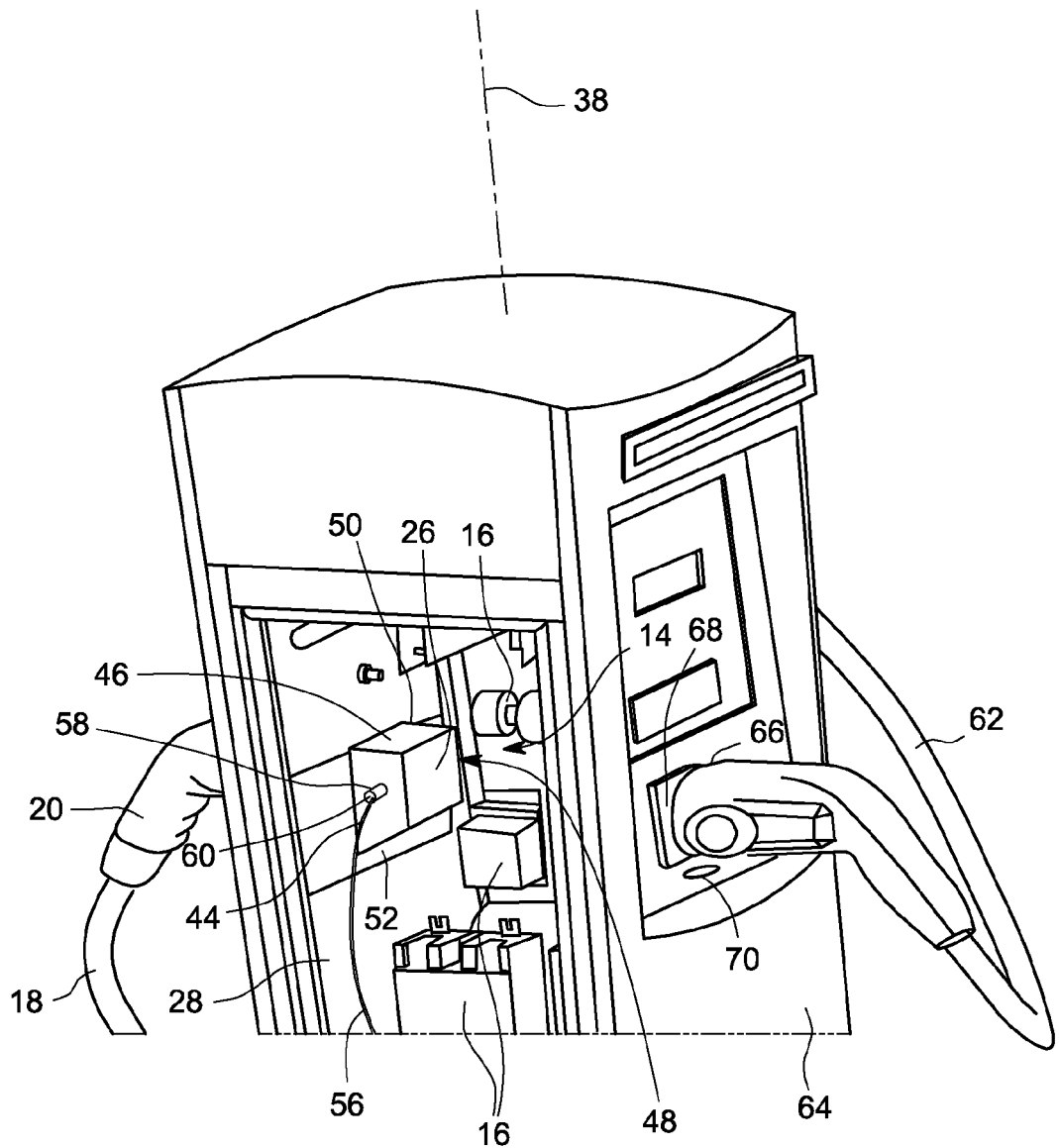
FIG. 2 is a sectional view of the charging station of FIG. 1, with a door removed.

FIGS. 1 and 2 illustrate an exemplary charging station 10 for charging an electrically powered vehicle (not shown). In the exemplary embodiment, charging station 10 includes a housing 12 having an interior 14. Multiple vehicle charging components 16 (as shown in FIG. 2) are positioned within interior 14 of housing 12. Vehicle charging components 16 may include, without limitation, power conduits, transmission lines, power converters, power conditioners, circuit breakers, switching devices, or other components used in provide energy transfer from charging station 10 to the electrically powered vehicle. Housing 12 is configured to substantially enclose vehicle charging components 16 to protect such components from various environmental conditions, such as, for example, weather, debris, insects, and rodents, and/or to inhibit unauthorized access to vehicle charging components 16.

Charging station 10 includes a charging conduit 18 to conduct energy from charging station 10 to the electrically powered vehicle. Charging conduit 18 includes a charging connector 20 configured to plug into the electrically powered vehicle. When not in use to charge the electrically powered vehicle, charging connector 20 is parked or stored at housing 12. Specifically, charging station 10 includes a receptacle 22 positioned within a receptacle opening 24 defined in housing 12. Charging connector 20 is positioned within receptacle 22 to, for example, reduce the potential for damage to charging connector 20 and manage charging connector 20 when not in use.

As shown in FIG. 2, charging station 10 includes an enclosure 26 coupled to housing 12. Specifically, in the exemplary embodiment, enclosure 26 is coupled to an internal surface of housing wall 28 of housing 12 and substantially surrounds receptacle opening 24. While enclosure 26 is illustrated as mounted on housing 12, it should be appreciated that various different assemblies of housing 12 and enclosure 26 may be provided in other charging station embodiments. In one example, enclosure 26 is formed integrally with at least a portion of housing 12. In another example, a portion of enclosure 26 is formed integrally with at least a portion of housing 12, and assembled with remaining portions of enclosure 26. Additionally, or alternatively, enclosure 26 may be coupled to one or more internal and/or external surfaces of housing wall 28 by, for example, screws, rivets, welds, adhesive, and/or other suitable fasteners.

Figure 3:
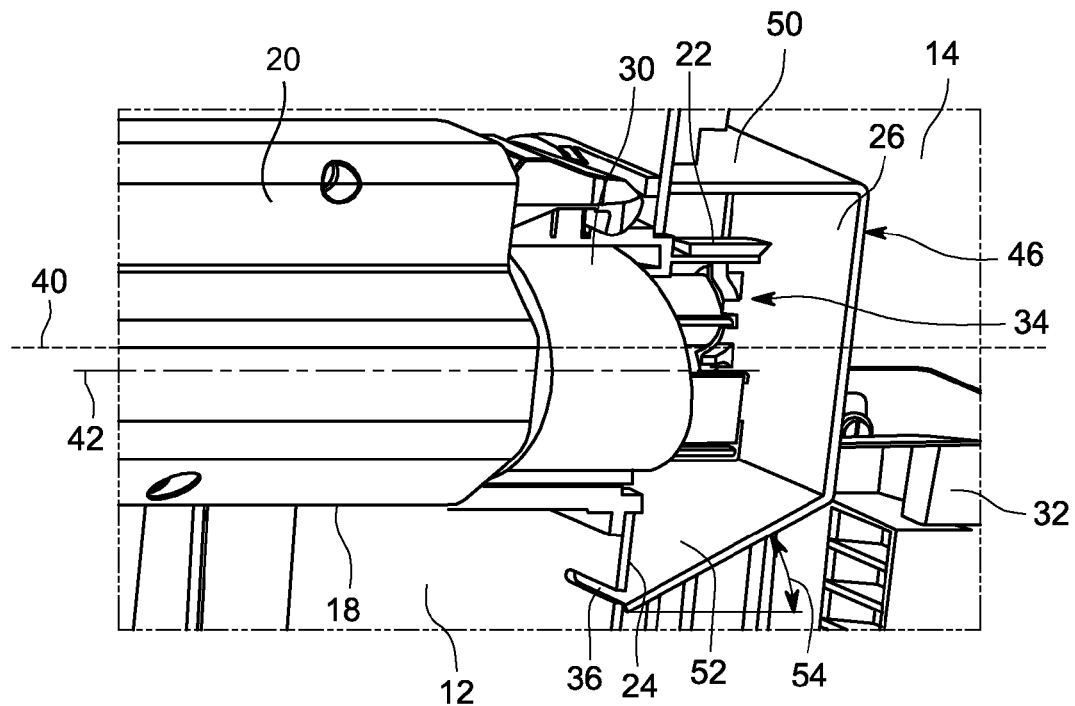
FIG. 3 is a sectional view of an enclosure and a receptacle, included in the charging station of FIG. 1.

In the exemplary embodiment, receptacle 22 includes a front portion 30 and a back portion 32. As shown in FIG. 3, receptacle 22 is coupled to housing 12 and within receptacle opening 24, such that front portion 30 is disposed outside of housing 12, while back portion 32 is disposed within enclosure 26. It should be appreciated that different orientations and/or portions of receptacle 22 may be positioned within and/or outside of housing 12 and/or enclosure 26 in other charging station embodiments. As should be appreciated, when installed as illustrated in FIG. 3, front portion 30 of receptacle 22 is accessible from outside charging station 10 to receive charging connector 20. Charging connector 20 is received within receptacle 22, so that at least a portion of charging connector 20 is received within enclosure 26.

Depending on the environment in which charging station 10 is installed, charging connector 20 may be exposed to rain, condensation, and/or other forms of fluid. In the embodiments described herein, enclosure 26 is configured to drain such fluid away from charging connector 20, while substantially sealing interior 14 of housing 12 from receptacle 22. Specifically, as shown in FIGS. 2 and 3, enclosure 26 is sealingly coupled to an internal surface of housing wall 28. This sealed coupling enables charging connector 20 to be positioned at least partially within receptacle opening 24 and prevent moisture or water from environmental conditions, such as rain, sleet, snow and condensation, from entering interior 14 through receptacle 22 and/or receptacle opening 24. As such, any fluid entering enclosure 26, through receptacle 22 and/or receptacle opening 24 is limited to enclosure 26 and prevented from entering interior 14.

In the exemplary embodiment, receptacle 22 includes a drain port 34 disposed at back portion 32, as shown in FIG. 3. Drain port 34 is structured to drain fluid from within receptacle 22 to inhibit and/or reduce interaction between one or more components of charging connector 20 (e.g., a conductor) and the fluid. More specifically, based on the relative position of drain port 34, fluid is permitted to flow from drain port 34 into enclosure 26. Enclosure 26 is substantially separated and/or sealed from interior 14. As shown in FIGS. 1 and 3, in the exemplary embodiment, housing 12 defines a drain opening 36. In the exemplary embodiment, drain opening 36 is disposed below the receptacle opening 24 and communicates with the interior of enclosure 26. It should be appreciated that drain opening 36 may be positioned elsewhere is other charging station embodiments, while still providing communication between the interior of enclosure 26 and the outside of charging station 10. Further, while the drain opening 36 is an ovular shape is this example embodiments, other shapes and configurations of drain opening 36 may be employed in other embodiments.

Drain opening 36 permits fluid to flow from within enclosure 26 to outside of housing 12. More specifically, in the exemplary embodiment, when fluid enters the enclosure 26 through receptacle 22 and drain port 34, the fluid is permitted to flow from receptacle 22 into enclosure 26. As a result, a wide variety of different receptacles may be used with charging station 10, without regard to whether the receptacle includes a front, side, or a back drain port thereon. As such, receptacle opening 24 and/or enclosure 36 may be configured in a variety of different ways to accommodate such different receptacles. Once the fluid enters enclosure 26 through drain port 34 of receptacle 22, it is directed to the outside of housing 12 through the drain opening 36.

As used herein, the term "angle" refers to an orientation of an object from outside of a charging station toward one or more vertical axes, such as vertical axis 38, and relative to one or more horizontal axis, such as horizontal axis 42, as shown in FIG. 1. Further, the orientation of receptacle 22 may be described herein with reference to its longitudinal axis 40, as shown in FIG. 3.

Figure 4:
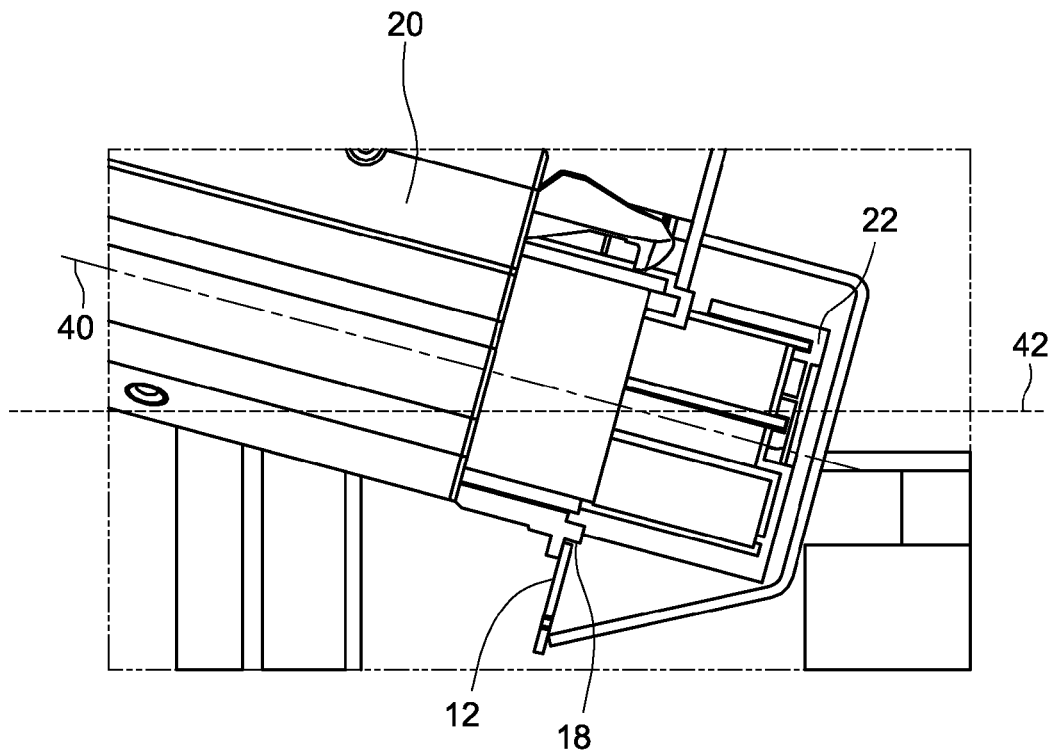
FIG. 4 is a sectional view of the receptacle disposed at an angle toward a vertical center axis of the charging station of FIG. 1.

Referring to FIG. 3, receptacle 22 is oriented substantially horizontally (as indicated by axis 40 with reference to horizontal axis 42). In this example, charging connector 20 may be received into receptacle 22, through substantially horizontal movement of charging connector 20. In other embodiments, such as shown in FIG. 4, receptacle 22 is positioned at a downward angle toward vertical axis 38, relative to horizontal axis 42. In this example, charging connector 20 may be received into receptacle 22, through at least partially downward movement of charging connector 20 toward vertical center axis 38. In still other embodiments, receptacle 22 may be positioned at an upward angle toward vertical center axis 38 (not shown), relative to horizontal axis 42. Charging station 10 is able to provide various orientations for receptacle 22 by inclusion of enclosure 26 and drain port 34, which control fluid entering charging station 10 through receptacle 22. Moreover, a variety of different receptacles may be used with charging station 10. Specifically, for example, receptacles 22 used in electrically powered vehicles, which drain fluid flow to the back portion of receptacle 22, may be the same receptacles used in charging station 10. Use of such standard receptacles 22 may provide reduced cost and/or efficiency during manufacturing, as compared to receptacles specially designed to drain fluid from a front portion of the receptacle and/or away from known housings.

As shown in FIG. 2, enclosure 26 includes two side walls 44 and 48, a back wall 46, a top wall 50, and a slanted (and/or angled) bottom wall 52. In the exemplary embodiment, bottom wall 52 is disposed at angle 54 (shown in FIG. 3) to bias fluid within enclosure 26 toward drain opening 36. Angle 54 may be, without limitation, between about 10 degrees and about 60 degrees above the horizontal axis 42 of housing 12. In another embodiment, angle 54 may be between about 20 degrees and about 45 degrees above the horizontal axis 42 of housing 12. In yet another embodiment, angle 54 may be between about 30 degrees and about 40 degrees above the horizontal axis 42 of housing 12. In the exemplary embodiment, angle 54 is approximately 35 degrees. In one or more embodiments, angle 54 may be dependent on the size and/or shape x.

Further, as shown in FIG. 3, bottom wall 52 of enclosure 26 is substantially aligned with drain opening 36. Substantial alignment of bottom wall 52 and drain opening 36 allows fluid to exit enclosure 26 without substantial obstruction to the fluid flow from enclosure 26. It should be appreciated that various different configurations of enclosures (e.g., size, shape, orientation, angle, and/or other aspects thereof) may be included in other embodiments, while performing as described herein. In one example, drain opening 36 may extend the entire width of enclosure 26 to permit fluid to flow out of enclosure 26 efficiently. Further, bottom wall 46 may be angled from the side walls 44 and 48 toward a center of enclosure 26 to further bias fluid flow toward the centrally-located drain opening 36. In other examples, the enclosure may be shaped and/or configured to bias fluid to one or more different locations to hold and/or expel the fluid from housing 12. In several embodiments, the configuration of enclosure 26 may be dependent on the size and shape of receptacle opening 24 and/or receptacle 22.

In the exemplary embodiment, a wire 56 extends from receptacle 22, which is terminated within interior 14 to provide one or more signals to one or more vehicle charging components 16. Such signals may indicate, for example, a presence of charging connector 20 within receptacle 22. As shown in FIG. 2, wire 56 extends through a wire opening 58 in side wall 44 of enclosure 26. In the exemplary embodiment, a grommet 60 is disposed within wire opening 58 around wire 56 to substantially seal wire opening 58, while permitting wire 56 to extend therethrough and into interior 14.

In the exemplary embodiment, grommet 60 is constructed of one or more elastomeric materials or other material suitable to inhibit fluid within enclosure 26 from entering interior 14. Further, wire opening 58 is disposed in a top or upper portion of enclosure 26. In this manner, based on the orientation of enclosure 26 and the position of drain opening 36, fluid is biased away from wire opening 58 to reduce the potential for ingress of fluid into interior 14 through wire opening 58. It should be appreciated that wire opening 58 may be disposed otherwise in other charging station embodiments. For example, wire opening 58 may be defined in back wall 46, at a top or a bottom portion thereof.

Referring again to FIGS. 1-2, charging station 10 includes a second charging conduit 62 having a charging connector 64. Charging station 10 further includes a second receptacle 66 for receiving second charging connector 64, which is mounted at a second receptacle opening 68. A second enclosure (not visible) is configured and performs consistently with enclosure 26, as described above. A second drain opening 70 is configured to permit fluid from second receptacle 66 to exit the second enclosure is shown in FIG. 2. Further, as shown, first and second receptacles 22 and 66 are positioned on opposite sides of housing 12. It should be appreciated, however, that a different number, orientation and/or relative positions of receptacles may be included in other charging station embodiments.

Figure 5:
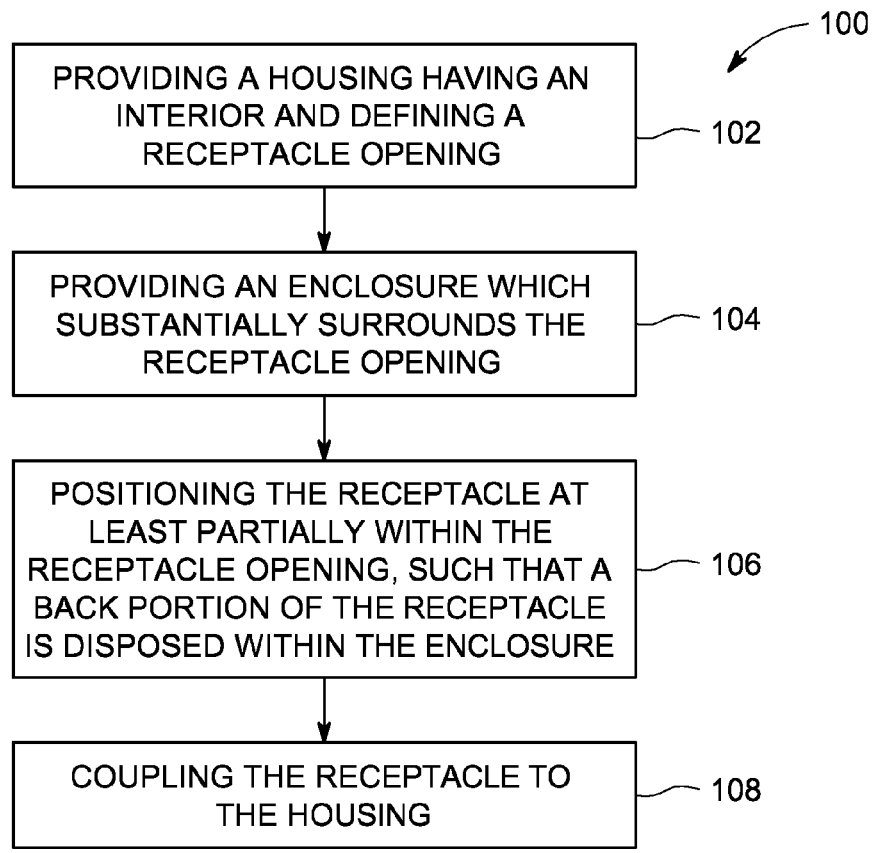
FIG. 5 is a flow chart of an exemplary method for fabricating a charging station for charging an electrically powered vehicle.

FIG. 5 is a flow chart of an exemplary method 100 for fabricating charging station 10. While method 100 is described with reference to charging station 10 of FIGS. 1-4, it should be appreciated that method 100 may be used to fabricate a wide variety of charging stations, and therefore is not limited to fabricating charging station 10. Likewise, charging station 10 may be fabricated through a variety of methods. Method 100 includes providing 102 a housing, such as housing 12 shown in FIG. 1, having an interior, such as interior 14 shown in FIG. 2, and defining a receptacle opening, such as receptacle opening 24 shown in FIG. 3. The receptacle opening is configured to receive a receptacle, such as receptacle 22 as shown in FIG. 3. Method 100 further includes providing 104 an enclosure, such as enclosure 26 as shown in FIG. 2, which substantially surrounds the receptacle opening and is configured to seal the receptacle opening. The enclosure defines a drain opening, such as drain opening 36 as shown in FIG. 3, configured to permit fluid from a receptacle to exit the enclosure.

Method 100 further includes positioning 106 the receptacle at least partially within the receptacle opening, such that the back portion of the receptacle is disposed within the enclosure, and coupling 108 the receptacle to the housing. The receptacle may be coupled to the housing, for example, through one or more screws, rivets, welds, adhesives, and/or other suitable fasteners, potentially depending on the configuration of the receptacle and/or housing.

In one or more embodiments, positioning 106 the receptacle at least partially within the receptacle opening may include orienting the receptacle substantially in parallel with the horizontal axis, for example, as shown in FIG. 3. Alternatively, in other embodiments, positioning 106 the receptacle at least partially within the receptacle opening includes orienting the receptacle at an angle toward the vertical center axis, for example, as shown in FIG. 4. Additionally, method 100 may include inserting at least one wire extending from the receptacle through grommet, such as grommet 60 as shown in FIG. 2, where the grommet is configured to be positioned in the wire opening of the enclosure to substantially seal the wire opening.

Figure 6:
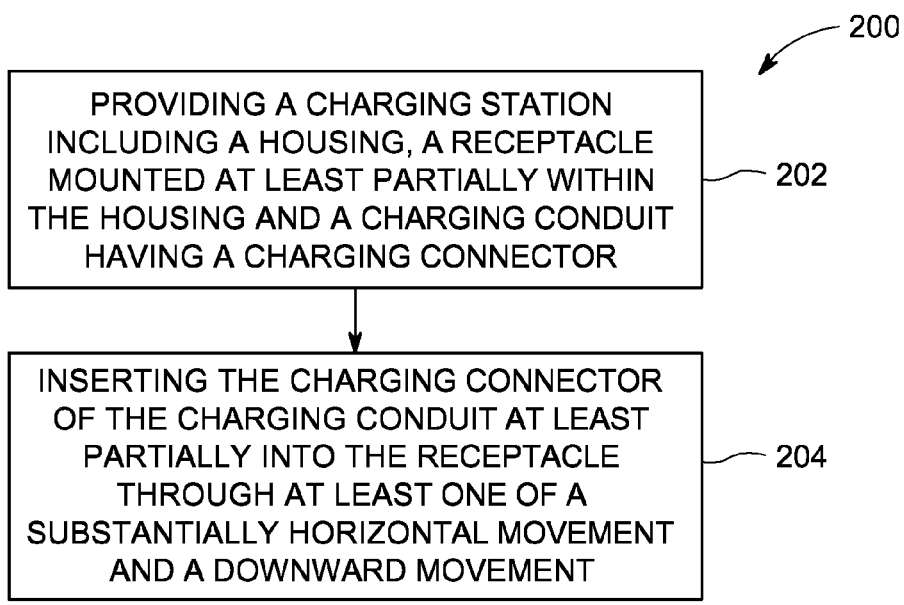
FIG. 6 is a flow chart of an exemplary method for operating a charging station for charging an electrically powered vehicle.

FIG. 6 is a flow chart of an exemplary method 200 for operating charging station 10. While method 200 is described with reference to charging station 10 of FIGS. 1-4, it should be appreciated that methods 200 may be used to operate a wide variety of charging stations, and therefore is not limited to charging station 10. Likewise, charging station 10 may be used consistent with one or more other methods. As shown in FIG. 6, method 200 includes providing 202 a charging station, such as charging station 10 shown in FIG. 1, including a housing, a receptacle mounted at least partially within the housing, and a charging conduit having a charging connector, such as charging conduit 18 and charging connector 20, as shown in FIG. 1. Method 200 further includes inserting 204 the charging connector of the charging conduit at least partially into the receptacle through at least one of a substantially horizontal movement and a downward movement, toward a vertical center axis of the charging station.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A charging station for use in charging an electrically powered vehicle, said charging station comprising:

a housing having an interior, said housing configured to enclose at least one vehicle charging component and defining a first receptacle opening;

a first receptacle configured to receive a charging connector, the receptacle including a front portion and a back portion, said back portion of said first receptacle including a first drain port configured to permit a fluid flow to drain from said first receptacle; and a first enclosure substantially surrounding said first receptacle opening and configured to seal said first receptacle opening, said first receptacle configured to be positioned at least partially within said first receptacle opening, such that said back portion of said first receptacle is positioned within said first enclosure, said housing defining a first drain opening configured to permit a fluid flow from said first receptacle to an exterior of said first enclosure.

2. The charging station of claim 1, further comprising a charging conduit having a charging connector, said charging connector configured to be received in said first receptacle and at least partially within said first enclosure.

3. The charging station of claim 1, wherein said housing defines a horizontal axis, and wherein said first receptacle has a longitudinal axis in parallel with said horizontal axis.

4. The charging station of claim 1, wherein said housing defines a vertical center axis, and wherein said first receptacle has a longitudinal axis disposed at an angle with respect to said vertical center axis of said housing.

5. The charging station of claim 1, wherein said first enclosure includes a bottom wall configured to bias a fluid flow toward and through said first drain opening.

6. The charging station of claim 5, wherein said housing defines a vertical center axis and a horizontal axis, and wherein said bottom wall of said first enclosure is angled between about 10 degrees to about 50 degrees above the horizontal axis of said housing to bias a fluid flow toward and through said first drain opening.

7. The charging station of claim 5, wherein said first enclosure is in sealing contact with said housing, said bottom wall of said first enclosure substantially aligned with said first drain opening.

8. The charging station of claim 1, wherein said enclosure includes a wire opening;
further comprising a grommet disposed at least partially within said wire opening and configured to substantially seal said wire opening with at least one wire extending therethrough.

9. The charging station of claim 1, wherein said enclosure includes a wire opening, and wherein said first receptacle includes at least one wire extending through said wire opening;
further comprising a grommet disposed at least partially within said wire opening and configured to substantially seal said wire opening with said at least one wire extending therethrough.

10. The charging station of claim 1, further comprising a second receptacle having a front portion and a back portion, said back portion of said second receptacle including a second drain port; and
a second enclosure substantially surrounding a second receptacle opening defined in said housing and configured to seal said second receptacle opening, said second receptacle configured to be positioned at least partially within said second receptacle opening, such that said back portion of said second receptacle is positioned within said second enclosure, said housing defining a second drain opening configured to permit a fluid flow from said second receptacle to an exterior of said second enclosure.

11. The charging station of claim 10, wherein said first receptacle and said second receptacle are positioned on opposite sides of said housing.

12. A charging station for use in charging an electrically powered vehicle, said charging station comprising:
a housing having an interior, said housing configured to enclose at least one vehicle charging component and defining a receptacle opening extending through a sidewall of said housing; and
an enclosure positioned at least partially within said interior of said housing and substantially surrounding said receptacle opening, said enclosure configured to seal said receptacle opening, said receptacle opening configured to receive a receptacle at least partially therein, such that a back portion of the receptacle is positioned within said enclosure, said housing defining a first drain opening configured to permit a fluid flow within said enclosure to an exterior of said enclosure.

13. The charging station of claim 12, wherein said enclosure is in sealing contact with said housing, said enclosure having a bottom wall substantially aligned with said drain opening.

14. The charging station of claim 12, wherein said enclosure includes a bottom wall configured to bias a fluid flow toward and through said drain opening.

15. The charging station of claim 12, wherein said enclosure is formed integrally with at least a portion of said housing.

16. The charging station of claim 12, wherein said enclosure includes a wire opening positioned at a top portion of said enclosure.

17. A method of fabricating a charging station for charging an electrically powered vehicle, said method comprising:
providing a housing having an interior and defining a receptacle opening and a drain opening, the receptacle opening configured to receive a receptacle;
providing an enclosure configured to substantially surround the receptacle opening and to seal the receptacle opening;
positioning a receptacle at least partially within the receptacle opening such that the back portion of the receptacle is disposed within the enclosure, wherein the drain opening is configured to permit a fluid flow from the receptacle to exit the enclosure; and
coupling the receptacle to the housing.

18. The method of claim 17, wherein positioning the receptacle at least partially within the receptacle opening includes orienting the receptacle substantially in parallel with a horizontal axis defined by the housing.

19. The method of claim 17, wherein the enclosure includes a bottom wall configured to bias a fluid flow toward and through the drain opening.

* * * * *

UNITED STATES PATENT AND TRADEMARK OFFICE
CERTIFICATE OF CORRECTION

| | | |
|---|---|---|
| PATENT NO. | : 9,090,172 B2 | Page 1 of 1 |
| APPLICATION NO. | : 13/355947 | |
| DATED | : July 28, 2015 | |
| INVENTOR(S) | : Ranga et al. | |

It is certified that error appears in the above-identified patent and that said Letters Patent is hereby corrected as shown below:

In the specification

In Column 4, Line 9, delete "enclosure 36" and insert -- enclosure 26 --, therefor.

In Column 5, Line 4, delete "bottom wall 46" and insert -- bottom wall 52 --, therefor.

Signed and Sealed this
Fifteenth Day of December, 2015

Michelle K. Lee
*Director of the United States Patent and Trademark Office*